L. H. THULLEN.
SYSTEM OF CONTROL.
APPLICATION FILED NOV. 23, 1915.
1,323,930.
Patented Dec. 2, 1919.
2 SHEETS—SHEET 1.
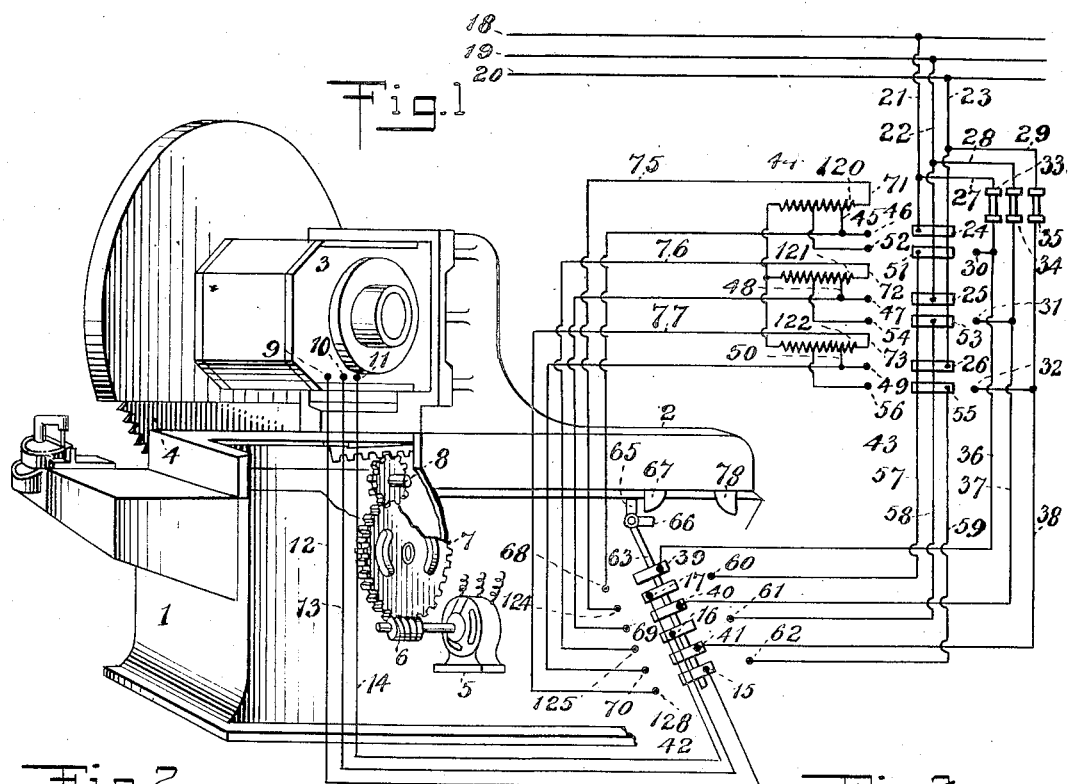
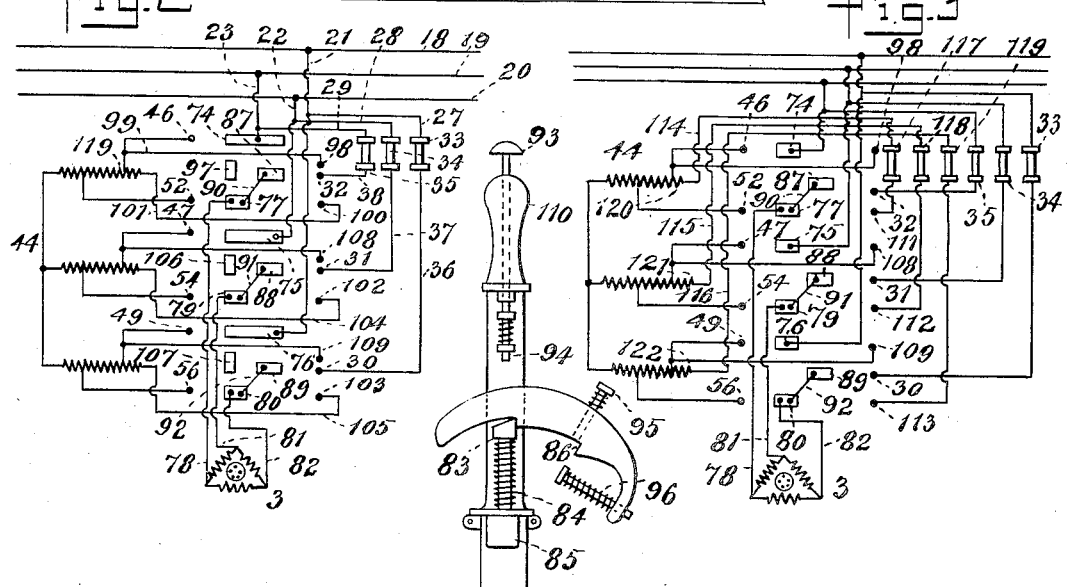
WITNESS
INVENTOR
Louis H. Thullen

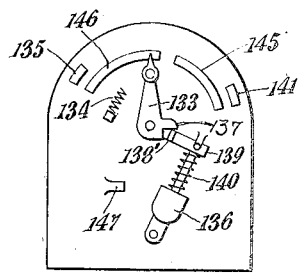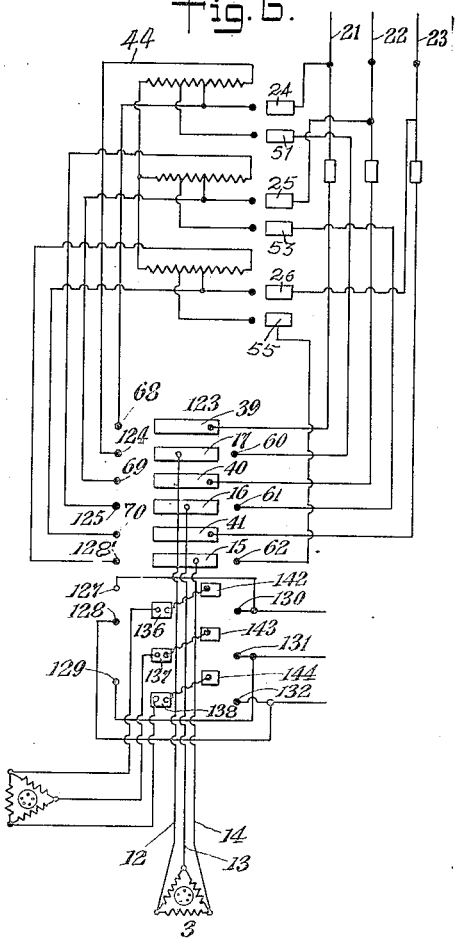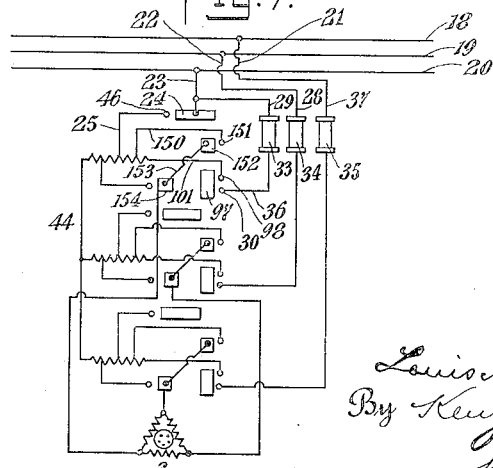

UNITED STATES PATENT OFFICE.

LOUIS H. THULLEN, OF NEW YORK, N. Y.

SYSTEM OF CONTROL.

1,323,930.  Specification of Letters Patent.  Patented Dec. 2, 1919.

Application filed November 23, 1915. Serial No. 62,987.

*To all whom it may concern:*

Be it known that I, LOUIS H. THULLEN, a citizen of the United States, residing at 50 Church street, New York city, in the county of New York and State of New York, have invented certain new and useful Improvements in Systems of Control, of which the following is a specification.

My invention relates to a novel means or system of automatically controlling power driven machinery and has particular reference to the control of alternating current motors, which is controlled by the action of the cutting mechanism when used in connection with feed carriages for friction saws, coal cutting machines or analogous mechanism having a moving table, or where the motor has a varying load or is subject to periodical heavy overload alternating with light or no load.

Generally, an alternating current motor has a pull-out torque of about two and a half times its normal rating. It is quite often desirable to operate such a motor periodically at four to five times its normal rating, and in order to accomplish this, I have devised a novel means whereby, during short periods of overload, a voltage higher than normal can be impressed upon the motor, thereby increasing the pull-out torque as the pull-out torque of a motor is in proportion to the second power of the applied voltage. In connection with this, I use means, whereby when the saw is running idle, or at light load, normal voltage is impressed on the motor. It is also possible to so build a motor that the pull-out torque will be in excess of two and a half times the pull-out torque of a standard motor, but when a motor is designed in this manner it is either excessively large, has a large magnetizing current or the magnetic circuit is operated at a very high density. To use a motor designed in this way, I find it desirable to apply a voltage lower than normal during light loads or when running empty, and my novel means for doing this constitutes the object of said invention.

To the above ends my invention in its broad aspects consists of the novel combination of an electric motor used in conjunction with a sawing machine, coal cutting machines and similar machines, a starting transformer therefor, and a novel means in connection with said starting transformer to apply higher than line voltage to said motor in accordance with the load required by the cutting machine.

It further consists of a novel combination of a starting means, a transformer, fuses and a novel arrangement of circuits, which is capable of general application, but is especially applicable to the control of alternating current motors used in connection with mechanism having a moving element, as a feed carriage for friction saws, or where the motor has a varying load.

For the purpose of illustrating my invention, I have shown in the accompanying drawings one form thereof which is at present preferred by me. Since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a friction saw or analogous mechanism equipped with a novel control system embodying my invention, two controllers being shown diagrammatically with the necessary starting transformer and the fuse cut-out device.

Fig. 2 represents diagrammatically a controller so arranged and built that a higher than normal voltage can be applied to an alternating current motor when one set of fuses only are used.

Fig. 3 represents a more simple type of controller to accomplish the same purpose, but using two sets of fuses.

Fig. 4 represents a handle and its adjuncts to be used in connection with the controller shown in Figs. 2 and 3, and so arranged that after the motor reaches normal speed at normal voltage, a latch can be released and the controller thrown in position of higher than normal voltage, but must be held there manually, and if the hand is removed from the controller, the controller will immediately go back to the normal voltage position.

Fig. 5 represents a plan view of the controller used in connection with the two alternating current motors referred to, whereby higher than normal voltage can be applied to one motor when the second motor is moving in one direction or the time of heavy overload, and when lower than normal voltage or normal voltage can be applied to said motor at a period of light or no load, and the second motor be reversed or stopped.

Fig. 6 represents diagrammatically this controller element that is used in connection with this controller seen in Fig. 5.

Fig. 7 represents a controller which is used in connection with a motor that is so designed that it operates at normal voltage at less than line voltage, and when operating at line or abnormal voltage, the starting transformer is cut out.

Similar numerals of reference indicate corresponding parts in the figures.

Referring to the drawings:—

Referring to Fig. 1, 1 designates the bed or housing of a sawing or analogous mechanism, 2 the carriage or reciprocating part, on which is mounted the saw or duty motor 3, and on the end of whose shaft revolves the disk or saw 4. The feed motor 5 is used to reciprocate the table 2 backward and forward by means of the worm 6 and the gears 7 and 8, which latter meshes with a suitable rack. In this figure, I have shown a three-phased motor, but it is well understood that in this art, a motor of any number of phases can be used for this purpose.

In connection with the motor 3, 9, 10 and 11 designate three terminals for the leads 12, 13 and 14, which connect to the controller segments 15, 16 and 17, respectively, of the controller 42. The cables 18, 19 and 20, seen in the upper portion of Fig. 1 are a source of three-phased alternating currents and from this source are connected cables 21, 22, and 23, respectively, which lead to segments 24, 25 and 26 of the controller 43. Cables 27, 28 and 29 are also attached to the cables 21, 22 and 23, respectively, and lead to the controller points 30, 31 and 32, respectively, through the medium of fuses 33, 34 and 35, while from said fuses 33, 34 and 35 are also taken the cables 36, 37 and 38, respectively, which go to the segments 39, 40 and 41.

44 diagrammatically shows a starting transformer for the motor 3, and in this starting transformer, I also use a second winding, or so arrange the taps that I can either get a higher than normal voltage or can operate the motor at a point lower than normal. In the transformer 44, I here show a tap 45 which, in this case, applies normal voltage when the controller is in the extreme left position and contact is made with the contact 46 with the controller segment 24, and the current is then applied to the transformer for the one phase through the cable 21 from the one main 18 of a source of alternating current supply.

When the controller 43 is in this position, current is also supplied to the other two phases in the following manner, from the main 19 of the source of supply through the cable 22, controller segment 25, contact 47, tap 48 to the other winding of the transformer, and for the other phase, through the medium of main 20 from the source of supply, cable 23, controller segment 26, contact 49 and tap 50 to the third winding of the starting transformer 44. When the controller is in this position, contact is made between segment 51 and contact 52, segment 53 and contact 54, and segment 55 and contact 56, whereby current at a reduced voltage is impressed upon the lines or cables 57, 58 and 59 to the contacts 60, 61 and 62 of controller 42. It can be readily seen that when the controller 43 is in this position, that normal voltage is applied to the starting transformer, and lower than normal voltage is applied to the motor 3 to start same when the controller 42 is in the extreme right position. When the controller 42 is in the extreme right position, low voltage is applied to the motor 3, as follows: Segment 17 is in contact with contact finger 60, segment 16 is in contact with contact finger 61, and segment 15 in contact with contact finger 62.

Both controllers are in this position when the motor 3 is started, as it is well known to those skilled in this art, that it is desirable to start an alternating current motor at less than normal voltage.

After motor 3 has attained approximately normal speed, the controller 43 is shifted to the right, at which time contact segment 51 is in contact with contact finger 30, controller segment 53 is in contact with contact finger 31, and controller segment 55 is in contact with contact finger 32. The movement to the right therefore connects motor 3 to the main 18, 19 and 20 directly without the medium of transformer 44, and normal voltage is applied to said motor.

63 designates the shaft that operates the cylinder or controller 42, and 64 is the end of this shaft, (here shown broken, for clearness of illustration). On the end of the shaft 64 are two projections 65 and 66, but not in the same plane, said projections 65 and 66 being here shown in the position they assume when the controller 42 is in the extreme right position. When the table 2 moves to the left of the position seen in Fig. 1, at which time it is desirable to apply a higher normal voltage to the motor 3, the lug or tappet 67, carried by said table comes in contact with the projection 65, and as the table continues to move to the left, the projection 65 is moved to a horizontal position and the controlled cylinder 42 is moved to the extreme left, thereby causing the segment 39 to come in contact with contact finger 68, controller segment 40 to come in contact with contact finger 69, and controller segment 41 to contact with contact finger 70. This brings the motor 3 in connection with the high voltage tap on the transformer taps 71, 72 and 73 of the transformer 44 through the medium of cables 75, 76 and 77, respectively. When the table 2 reaches the extreme left point of travel, the motor 5 is reversed and the table 2 moves toward the right, whereupon the lug or tappet 78 on the table 2 comes in contact with the projection 66, thereby moving the controller 42 to the extreme right position and impressing normal voltage on the motor 3, and this normal voltage remains on the motor until such a time as the table is again moved to the left.

It will be noticed that in this invention, I make use of an auxiliary winding on the starting transformer for obtaining a higher than normal voltage, by which means I save a separate transformer and by putting in or connecting another winding, I utilize the starting transformer which is a less expensive transformer than a regular one, as it is only in circuit part of the time, and therefore can be built with less copper and iron.

In Fig. 2, I have diagrammatically shown a controller to be used in connection with the saw and operated by the handle seen in Fig. 4. 3 designates the same motor as shown in Fig. 1, but diagrammatically illustrated. 18, 19 and 20 designate a source of three-phase alternating current supply, the cables 21, 22 and 23 being connected thereto, as already described with respect to Fig. 1. From the cables 21, 22 and 23 are leads 27, 28 and 29 attached to the fuses 33, 34 and 35, to which are attached leads 36, 37 and 38, and connected to the contact fingers 30, 31 and 32, substantially as already described.

44 is an auto transformer, similar to that shown in Fig. 1, the connections and taps also being similar. When the handle shown in Fig. 4 is moved to the extreme left, the controller is revolved to the left in such a manner that segment 74 makes contact with contact finger 45, thereby applying line voltage to one phase of the transformer 44, at the same time segment 75 makes contact with contact finger 47, which impresses line voltage on the other phase of transformer 44, and segment 76 makes contact with contact finger 49, thereby impressing line voltage on the other winding of transformer 44.

Simultaneously with this operation, the segment 77 makes contact with contact finger 52, thereby impressing less than line voltage on one phase of the motor 3, through the medium of cable 78. Simultaneous with this, segments 79 and 80 make contact with contact fingers 54 and 56, thereby impressing less than line voltage on motor 3, through the medium of cables 81 and 82. When the controller is in this position, which is the starting position, less than line voltage is applied to the motor in a manner well known to those skilled in the art, as is evident.

Referring now particularly to Fig. 4, it will be seen that when the controller is in this position, the latch 83 is depressed against the spring 84, moving the piston in dash pot 85, which may be of any conventional type, downwardly. The handle, which is in its off position as seen in Fig. 4, is first moved to the left and is then quickly moved to the right until the latch 83 comes against the stop 86. This particular cycle of the controller handle is known in this art, and *per se* forms no part of my invention. When the handle occupies a position to the right of that seen in Fig. 4, and the latch 83 is against the stop 86, the controller, as shown in Fig. 2, is also moved to the right, so that segments 87, 88 and 89 make contacts with the contact fingers 32, 31 and 30, respectively, thereby impressing full line voltage on the motor 3, through the medium of cables 27, 28 and 29, fuses 33, 34 and 35, cables 36, 37 and 38, connections 90, 91 and 92, and cables 78, 81 and 82.

When it is desirable to impress higher than normal voltage on the motor, which is at the time of cutting, or a higher voltage than when the latch 83 of the controller handle is against stop 86, as above described, the button 93 is pressed downwardly, thereby engaging the end of the rod 94 with latch 95, which in turn depresses latch 83, and makes it possible to move the controller handle still farther to the right and against the tension member 96. When the handle seen in Fig. 4 is in this extereme right hand position the controller is moved still farther to the right so that segment 97 makes contact with both contact fingers 32 and 98 (see Fig. 2), thereby making a path for one phase of the current through the fuse 35, lead 38, cable 99, and impressing normal or line voltage on one winding of the transformer 44, as was done when the controller was in the position to the left. Simultaneously with this, the segment 77 makes contact with contact finger 100, thereby impressing higher than normal voltage on the motor 3, from the one phase of the transformer 44 through the medium of cable 101 and cable 78. Simultaneously with this, the other two segments 79 and 80 make contact with contact fingers 102 and 103, thereby impressing higher than normal voltage through two phases from the transformer 44 on the motor 3, through the medium of cables 104 and 105, and cables 81 and 82 (see Fig. 2). It will be noticed that at the same time segments 106 and 107 make contacts with the contact fingers 31 and 108, impressing line voltage on one winding of the transformer 44, and the other winding of the transformer 44 by making connections between contact fingers 30 and 109.

It will also be noticed that when the controller is moved to the extreme right hand position and beyond notch 86, the controller segments 87, 88 and 89 disengage with the contact fingers 32, 31 and 30. It will also be noticed that the fuses 33, 34 and 35 are in the circuit path, when the latch 83 of the controller handle 110 shown in Fig. 4, is pressed against the notch 86, and also when said controller is at its extreme righthand position. It will be noticed, referring to Fig. 4, that it is necessary to keep hold of the handle 110, which tends to be thrown to the left on account of the tension of the compression member 96. Should the hand be removed from handle 110, said handle will immediately go to normal position and the latch 83 will be against the notch 86, thereby impressing line voltage or lower voltage on the motor 3, than when said controller handle was in the extreme right position.

Fig. 3 shows another means of impressing higher than normal voltage on a motor, which is usually at the time of cutting, but in this case two sets of fuses are arranged instead of one, as in Fig. 2. On the other hand, the controller is more simple, and therefore less expensive.

When the controller handle 110 of Fig. 4 is in the extreme lefthand position, the controller of Fig. 3 moves to the left, so that contact is made between segments 74, 75 and 76 and contact fingers 46, 47 and 49, thereby impressing line voltage on the three windings of the transformer 44. At the same time, segments 77, 79 and 80 make contact with the contact fingers 52, 54 and 56, thereby impressing less than normal voltage on the motor 3, which is usually done in starting, and is the same operation as was done in Fig. 2, when the controller handle was in extreme left position.

Still referring to Fig. 3, it will also be noticed that when the controller handle is in the extreme left position, the fuses 33, 34 and 35 are not in circuit, but when the latch 83 is against notch 86, fuses 33, 34 and 35 are in circuit both in Figs. 2 and 3. When the handle 110 is moved to the right so that the latch 83 is against stop 86, the controller in Fig. 3 is moved also to the right, whereby controller segments 87, 88 and 89 make contact with the fingers 32, 31 and 30, thereby impressing line voltage on the motor 3, through the medium of cables 90, 91 and 92, and leads 78, 81 and 82.

When the controller handle 110, Fig. 4, is moved to the extreme right so as to compress the tension member 96, the controller, Fig. 3, is also moved to the extreme right, whereby segments 77, 79 and 80 make contact with contact fingers 111, 112 and 113, thereby impressing higher than normal voltage on the motor 3, from the transformer 44, through the medium of cables 114, 115 and 116, and fuses 117, 118 and 119. Simultaneously with this movement, segments 74, 75 and 76 make contact with contact fingers 98, 108 and 109, thereby impressing line voltage on the three windings of the transformer 44, which furnish the current for the motor 3.

Fig. 6 diagrammatically shows a controller which combines the controller 42 and a switch to start, stop and reverse the motor 5.

It will be noticed by the previous description, that an extra winding shown by 120, 121, 122 in Fig. 1 is combined with the starting transformer 44, in order to get higher than line voltage. I do not, however, wish to limit myself to this particular means of obtaining this higher voltage, as another and separate transformer could also be used for this purpose.

The transformer 44 is an auto transformer, whereby line voltage is applied at one point of each winding, and lower than line voltage is taken off at another point in order to start the motor at a lower than line voltage, and another point to obtain higher than line voltage for the motor, when operating under heavy overload. Neither do I wish to limit myself to an auto transformer of this nature, so that higher than line voltage can be applied to the motor.

As hereinbefore stated, a motor can be so designed that it will operate at normal or line voltage, and give a pull-out torque four to five times normal, but the motor should only operate with this design for a short period of time.

In Fig. 6, the six long segments 39, 17, 40, 16, 41 and 15 correspond to the six long segments having similar numbers, as controller 42 of Fig. 1, the contact fingers of controller 123 of Fig. 6 corresponding to the contact fingers of controller 42 of Fig. 1, namely 68, 124, 69, 125, 70 and 128 and the leads attached thereto to the transformer 44, Fig. 1, and make connections at the same place as shown in Fig. 1, and the cables from contact fingers 60, 61 and 62 of Fig. 6 lead to the controller segments 51, 53 and 55 of controller 43 of Fig. 1, and the cables from segments 39, 40 and 41 lead to the fuses 33, 34 and 35, Fig. 1.

The lower part of controller 123, Fig. 6, is a simple reverse switch for a three-phase induction motor, but it will be understood that a single phase motor may be employed without departing from the spirit of my invention. The entire controller seen in Fig. 6 operates in the following manner.

The controller seen in Fig. 6 is shown in the off or neutral position, the general appearance of the top of the controller or the operating mechanism being understood from Fig. 5. The controller, as shown in Figs. 5 and 6, is so designed that the controller handle 133 can be readily moved to the left until it makes contact with the tension member 134. When the controller is moved in this direction the six long upper segments of the controller 123, Fig. 6, make contact with the contact fingers 60, 61 and 62, thereby impressing line voltage on the motor 3, which causes said motor to revolve at normal speed.

When the handle 133, Fig. 5, is moved still farther to the left so as to compress the compression member 134, until the pointer of handle 133 points to the indicating segment 135, the segments 136, 137 and 138 make contact with the contact fingers 130, 131 and 132, thereby operating motor 5 in such a direction as to cause the table 2 to move in the backward direction or away from the work on the cutting table. At this time, the motor 3 is running empty, and there is very little load thereon. When it is desired to move the table 2 toward the work and to put a higher voltage on motor 3, in order to prepare it for heavy overload, the controller handle 133 shown in Fig. 5, is then moved to the right, until the six long upper segments shown in Fig. 6 make contact with contact fingers 68, 124, 69, 125, 70 and 128, thereby impressing a higher voltage on the motor 3. It will be noticed by referring to Fig. 5, that the handle 133 is retarded in its movement by the dashpot 136 of usual construction, the object of this dash-pot being to make it impossible for the operator to suddenly throw the lever 133 to the extreme right hand position and start motor 5, as the saw or disk 4 connected with motor 3 has considerable inertia, and it takes some time for the motor 3 to get this disk revolving at the proper speed. When connected to the higher voltage, therefore, it is desirable to have some form of mechanism whereby there will be an interval of time before the motor 5 is reversed.

When the handle 133, Fig. 5, is moved to the right the projection 137 comes into contact with the projection 138', attached to the arm 139, which is in turn attached to the rod 140 of the piston in the dash-pot 136. It is therefore impossible to move the handle 133 quickly to the extreme right-hand position, as it is necessary to compress the fluid and expel the same from dash-pot 136, which can only be done slowly and requires quite an interval of time. When the fluid is all expelled from the dash-pot 136, the handle 133 is then free to move to the extreme right-hand position, until it points to the indicating segment 141. At this time, the controller 123 is in the extreme left position, whereby segments 142, 143 and 144 make contact with the contact fingers 127, 128' and 129, thereby reversing the motor 5, causing the table 2 to move to the left and to such a position that work will be done by the motor 3.

It will also be noticed that there is a tension member surrounding the rod 140 connected to the arm 139. This tension member is located between the arm 139 and the top of the dash-pot 136, and as soon as the operator takes his hand from the lever 133, said lever is immediately moved to the left until it is in the position shown by Fig. 5, which is a point of low voltage for the motor 3. It is the intention of this invention to have the motor 3 operate at low voltage, except at such time as it is doing work or requires a high voltage for work or heavy overload.

It will be noticed when the controller handle 133 is to the extreme left and compressing the tension member 134, that when the hand is released from handle 133, the latter will move to the right and to such a position that motor 5 will be disconnected from a source of supply.

The movement of the dash-pot 136 is arrested by the stop 147 when the controller handle 133 is in the extreme right hand position, said stop 147 therefore limiting the extent of movement of said controller handle.

Referring now to Fig. 7, 18, 19 and 20 designate mains which are a source of current supply, and 21, 22 and 23 designate taps therefrom, while 37, 28 and 29 designate branch taps leading to the fuses 33, 34 and 35. The transformer starter is shown by 44. For simplicity only, connections to one phase of this controller is shown, the other phases having similar connections.

When the controller is to the left or in starting position, one phase of the transformer is connected to one phase 20 of the source of current supply through the tap 25, contact finger 46, segment 24 and tap 23.

After the motor attains speed, the controller is then quickly shifted to the right or at a point of normal voltage, for which the motor is designed, and at which point the motor operates empty or with normal or light load. As a starting transformer is built to only start, the motor and the iron are operated at too high a density with normal winding of the transformer for continuous operation, so I here connect the source of supply to a connection on the winding so that more of the winding of the transformer is in circuit, thereby operating the iron core of the transformer at the proper density for continuous connection. At the same time, the motor is also connected to a different tap to give the proper voltage for the same, which is lower than line voltage. When the controller is in this position, the current is from the line 20 through the taps 23 and 29, fuse 33, line 36, contact finger 30, segment 97, contact finger 98 and tap 101, to one phase of the starting transformer 44. Simultaneously with this, connection is made at a lower voltage point of the transformer with the motor through the tap 150, contact finger 151, segment 152, connection 153, and main 155, to one phase of the motor 3.

When it is desired to operate the motor at heavy overload and at a higher voltage than which it is normally designed to operate continuously, the controller is moved to the extreme right hand position, at which time the motor is directly connected to the source of current supply and the transformer out of circuit. At this time, controller segment 154 makes contact with contact finger 30, and segment 97 is disconnected from contact finger 30 and 98.

It will now be apparent that I have devised a novel and useful construction of a control system for electric motors, which embodies the features of advantages enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a system of control for electric motors, a controller therefor having one running position for the motor, operating at normal voltage, and another running position for said motor running at abnormal voltage, and a means for normally keeping the controller from the abnormal voltage position.

2. In a system of control for electric motors, a controller therefor, having a starting position and one normal running position for the motor operating at one voltage, and another normal running position for the motor operating at a higher voltage, and means for normally preventing the controller from entering the position of higher voltage.

3. In a system of control for electric motors, a controller therefor having one position for the motor operating at one voltage, and another position for the motor operating at a higher voltage, and resilient means for returning the controller to the lower voltage position when the controller handle is released.

4. In a system of control for electric motors, a controller therefor having a starting position and one position for the motor operating at one running voltage, and another position for the motor operating at a higher running voltage, a handle for said controller, a latch normally keeping the controller from being moved to a higher voltage position, and means for disengaging said latch so said controller may be moved to a higher voltage position.

5. In a system of control for electric motors, a controller therefor having one position for the motor operating at one voltage, and another position for the motor operating at a higher voltage, a handle for said controller, a latch normally keeping said controller from being moved to a higher voltage position, a means disengaging said latch so the controller can be moved to the higher voltage position, and a tension member whereby the controller is returned to lower voltage position.

6. In a starter and controller for an electric motor, a transformer therefor, a controller having a neutral position, a starting position, a position of low voltage operation, and a position of high voltage operation, means whereby the controller cannot be moved to the low voltage operating position without first going to the starting position, and a means normally tending to move the controller from the high voltage position.

In testimony whereof I affix my signature in presence of two witnesses.

LOUIS H. THULLEN.

Witnesses:
LILLIAN B. KRUGER,
GEO. F. WOOLSTON.